(12) United States Patent
Mizuno

(10) Patent No.: US 8,305,446 B2
(45) Date of Patent: Nov. 6, 2012

(54) DOME TYPE MONITOR CAMERA DEVICE

(75) Inventor: Masafumi Mizuno, Kanagawa (JP)

(73) Assignee: Panasonic Corporation, Osaka (JP)

( * ) Notice: Subject to any disclaimer, the term of this patent is extended or adjusted under 35 U.S.C. 154(b) by 870 days.

(21) Appl. No.: 12/307,007

(22) PCT Filed: Jul. 2, 2007

(86) PCT No.: PCT/JP2007/063230
§ 371 (c)(1),
(2), (4) Date: Dec. 30, 2008

(87) PCT Pub. No.: WO2008/004517
PCT Pub. Date: Jan. 10, 2008

(65) Prior Publication Data
US 2009/0303325 A1    Dec. 10, 2009

(30) Foreign Application Priority Data

Jul. 7, 2006 (JP) ................................. 2006-187587

(51) Int. Cl.
*H04N 9/47* (2006.01)
(52) U.S. Cl. ......................... 348/151; 348/143; 396/427
(58) Field of Classification Search .......... 348/143–160; 396/427
See application file for complete search history.

(56) References Cited

U.S. PATENT DOCUMENTS

| | | | |
|---|---|---|---|
| 4,705,343 A | | 11/1987 | Simons |
| 4,862,442 A | * | 8/1989 | Tadokoro et al. ........... 369/44.14 |
| 5,368,254 A | * | 11/1994 | Wickholm ................... 244/3.16 |
| 5,386,112 A | * | 1/1995 | Dixon ........................... 250/234 |
| 5,414,521 A | * | 5/1995 | Ansley .......................... 348/123 |
| 5,708,638 A | * | 1/1998 | Braat et al. ................. 369/44.29 |
| 5,854,713 A | * | 12/1998 | Kuroda et al. ................ 359/850 |
| 6,091,548 A | * | 7/2000 | Chen ............................. 359/637 |
| 6,107,617 A | * | 8/2000 | Love et al. ................. 250/201.9 |
| 6,201,230 B1 | * | 3/2001 | Crowther et al. .......... 250/203.6 |

(Continued)

FOREIGN PATENT DOCUMENTS

EP    1008973 A1 *  6/2000

(Continued)

OTHER PUBLICATIONS

Watson; Tip-Tilt Correction for Astronomical Telescopes using Adaptive Control, Integrated Circuit Expo 1997.*

(Continued)

*Primary Examiner* — Abdullahi Salad
*Assistant Examiner* — Jimmy H Tran
(74) *Attorney, Agent, or Firm* — Pearne & Gordon LLP

(57) ABSTRACT

There is provided a domed monitoring camera apparatus allowing reduction of a shift in focus dependent on a variation in optical path length caused by a dome cover. The domed monitoring camera apparatus (1) includes a monitoring camera (3), a dome cover (5) which covers the monitoring camera (3), and a camera controller (25). The camera controller (25) functions as an adjustment unit which, when the dome cover (5) is attached, adjusts the focus of the monitoring camera (3) with the cover attached to correct a variation in optical path length caused by the dome cover (5). The camera controller (25) adjusts the focus of the monitoring camera (3) with the cover attached according to an optical path length affecting cover parameter which represents a dome cover character relative to increase or decrease of the optical path length of the monitoring camera (3).

18 Claims, 9 Drawing Sheets

U.S. PATENT DOCUMENTS

| | | | |
|---|---|---|---|
| 6,268,882 B1* | 7/2001 | Elberbaum | 348/151 |
| 6,356,396 B1 | 3/2002 | Chen et al. | |
| 6,357,936 B1* | 3/2002 | Elberbaum | 396/427 |
| 6,509,926 B1* | 1/2003 | Mills et al. | 348/143 |
| 6,549,323 B1* | 4/2003 | Hunt | 359/279 |
| 6,628,338 B1* | 9/2003 | Elberbaum et al. | 348/373 |
| 6,707,619 B1* | 3/2004 | Okuno | 359/694 |
| 6,735,012 B2* | 5/2004 | Hunt | 359/279 |
| 7,036,934 B1* | 5/2006 | Youssefi et al. | 351/221 |
| 7,151,558 B1* | 12/2006 | Kogane et al. | 348/151 |
| 7,306,383 B2* | 12/2007 | Jones et al. | 396/427 |
| 7,372,645 B2* | 5/2008 | Van Schaik et al. | 359/811 |
| 7,379,119 B1* | 5/2008 | Schuetz | 348/375 |
| 7,593,305 B1* | 9/2009 | Mallary | 369/112.01 |
| 7,609,321 B2* | 10/2009 | Yamane | 348/373 |
| 7,725,020 B2* | 5/2010 | Uchida et al. | 396/144 |
| 7,815,379 B2* | 10/2010 | Sato | 396/427 |
| 2001/0010537 A1* | 8/2001 | Lang et al. | 348/36 |
| 2002/0171557 A1* | 11/2002 | Wegener | 340/693.6 |
| 2003/0063366 A1* | 4/2003 | Hunt | 359/279 |
| 2003/0179433 A1* | 9/2003 | Hunt | 359/279 |
| 2005/0077489 A1 | 4/2005 | Knapp et al. | |
| 2005/0239544 A1* | 10/2005 | Steelman et al. | 463/29 |
| 2005/0285972 A1* | 12/2005 | Saiki | 348/373 |
| 2006/0024046 A1* | 2/2006 | Jones et al. | 396/427 |
| 2006/0028737 A1 | 2/2006 | Sparrold | |
| 2006/0050150 A1* | 3/2006 | Yamane | 348/151 |
| 2006/0177217 A1* | 8/2006 | Opmeer | 396/427 |
| 2007/0201862 A1* | 8/2007 | Van Schaik et al. | 396/427 |
| 2007/0292121 A1* | 12/2007 | Sato | 396/144 |
| 2009/0310956 A1* | 12/2009 | Takada et al. | 396/427 |

FOREIGN PATENT DOCUMENTS

| | | | |
|---|---|---|---|
| EP | 1 113 408 A1 | | 7/2001 |
| EP | 1136965 A1 * | | 9/2001 |
| EP | 1 602 958 A1 | | 7/2005 |
| EP | 1628122 A1 * | | 2/2006 |
| EP | 1628123 A1 * | | 2/2006 |
| EP | 1628492 A1 * | | 2/2006 |
| EP | 1628493 A1 * | | 2/2006 |
| EP | 1726927 A1 * | | 11/2006 |
| EP | 1832916 A1 * | | 9/2007 |
| EP | 1972422 A1 * | | 9/2008 |
| JP | 01-307371 A | | 12/1989 |
| JP | 09-080605 A | | 3/1997 |
| JP | 2004-184890 A | | 7/2001 |
| JP | 2004-356669 | | 12/2004 |
| JP | 2007-006397 A | | 1/2007 |
| WO | 95/35627 A1 | | 12/1995 |
| WO | 99/17150 A1 | | 4/1999 |
| WO | 99/18468 A1 | | 4/1999 |

OTHER PUBLICATIONS

International Search Report for PCT/JP2007/063230.
Supplementary European Search Report dated May 12, 2010.
European Office Action for Application 07768005.6 dated May 9, 2012.

* cited by examiner

FIG.4

| COVER MATERIAL AND OPTICAL PATH LENGTH VARIATION | | | | | |
|---|---|---|---|---|---|
| MATERIAL | NO COVER | ACRYLIC | QUART | CYCLOOLEFIN POLYMER | POLYCARBONATE |
| VARIATION ($\mu$m) | 0.0 | 38.3 | 39.7 | 40.2 | 43.9 |

FIG.5

| APERTURE VALUE AND OPTICAL PATH LENGTH VARIATION | | | |
|---|---|---|---|
| APERTURE VALUE | F2.8 | F5.6 | F11.2 |
| VARIATION ($\mu$m) | 0.0 | 12.9 | 18.4 |

FIG.6

| COLOR TEMPERATURE AND OPTICAL PATH LENGTH VARIATION | | | |
|---|---|---|---|
| COLOR TEMPERATURE ENVIRONMENT | 400~600nm | 600~800nm | 800~1000nm |
| VARIATION ($\mu$m) | 0.0 | 50.9 | 95.2 |

FIG.8

| COVER THICKNESS AND OPTICAL PATH LENGTH VARIATION (MATERIAL: CYCLOOLEFIN POLYMER) | | | | | | | | | |
|---|---|---|---|---|---|---|---|---|---|
| THICKNESS(mm) | 0 (NO COVER) | 0.5 | 1 | 1.5 | 2 | 2.5 | 3 | 3.5 | 4 |
| VARIATION (μm) | 0.0 | 5.3 | 10.7 | 16.2 | 20.0 | 27.9 | 33.9 | 40.2 | 46.6 |

FIG.9

| TRANSMISSIVITY AND OPTICAL PATH LENGTH VARIATION | | | |
|---|---|---|---|
| LIGHT INTENSITY | 1 | 1/4 | 1/16 |
| VARIATION ($\mu$m) | 0.0 | 12.9 | 18.4 |

DOME TYPE MONITOR CAMERA DEVICE

This application claims the benefit of Japanese Patent Applications No. 2006-187587 filed on Jul. 7, 2006 in Japan, the subject matter of which is hereby incorporated by reference.

TECHNICAL FIELD

The present invention relates to a domed monitoring camera apparatus allowing improvement of focus accuracy.

BACKGROUND ART

Conventionally, a domed monitoring camera apparatus has a monitoring camera contained in the interior of a dome cover and capturing through the dome cover an image of an object to be monitored. The camera apparatus of this type has been disclosed, for example, in Japanese Patent Laid-Open No. 2004-356669 (FIGS. 1 and 2, and the like).

The conventional monitoring camera apparatus includes mechanisms for back-focus adjustment, zoom adjustment and focus adjustment. In installing the camera, the dome cover is removed, and these mechanisms are manipulated so that back-focus adjustment, zoom adjustment and focus adjustment are done. For back-focus adjustment, the imaging element is moved; and for focus adjustment, the lens is moved. Back-focus adjustment is a type of focus adjustment. After completion of these adjustments, the adjustment mechanisms are fixed, and the dome cover is attached, so that the installation operation is completed.

There are multiple types of dome covers. The type of dome cover varies according to specifications about material, thickness, transmissivity and the like. For example, a smoked cover of a low transmissivity is used so that the monitoring camera inside the cover can be hardly seen from the outside. From a viewpoint of vandalproof, a greater thickness cover is useful.

In the conventional domed monitoring camera apparatus, however, when the dome cover is attached at the final stage of installation operation, the optical path length varies according to the presence/absence of the dome cover and the dome cover specifications; thus the focus position changes slightly, and an out-of-focus state may occur. Examples of dome cover specifications which vary the optical path length include material, thickness and transmissivity.

A purpose of the invention made in the above-mentioned background is to provide a domed monitoring camera apparatus which can reduce a shift or discrepancy in focus dependent on a variation in optical path length caused by a dome cover.

DISCLOSURE OF THE INVENTION

A domed monitoring camera apparatus according to the present invention includes a monitoring camera, a dome cover that covers the monitoring camera, and an adjustment unit that, when the dome cover is attached, adjusts the focus of the monitoring camera with the cover attached to correct a variation in optical path length caused by the dome cover.

According to another aspect of the present invention, there is provided a focus adjustment method for a domed monitoring camera apparatus having a monitoring camera covered with a dome cover, wherein when the dome cover is attached, the focus of the monitoring camera is adjusted with the cover attached so as to correct a variation in optical path length caused by the dome cover.

According to the present invention, there is provided a configuration which adjusts the focus of the monitoring camera with the cover attached to correct a variation in optical path length caused by the dome cover, thus allowing reduction of a shift or discrepancy in focus dependent on a variation in optical path length caused by the dome cover.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

FIG. 4 illustrates a variation in optical path length dependent on the cover material being one of the cover parameters;

FIG. 5 illustrates a variation in optical path length dependent on the aperture value;

FIG. 6 illustrates a variation in optical path length dependent on the color temperature;

FIG. 8 illustrates a variation in optical path length dependent on the cover thickness being one of the cover parameters;

FIG. 9 illustrates a variation in optical path length dependent on the cover transmissivity being one of the cover parameters;

Figure 1:
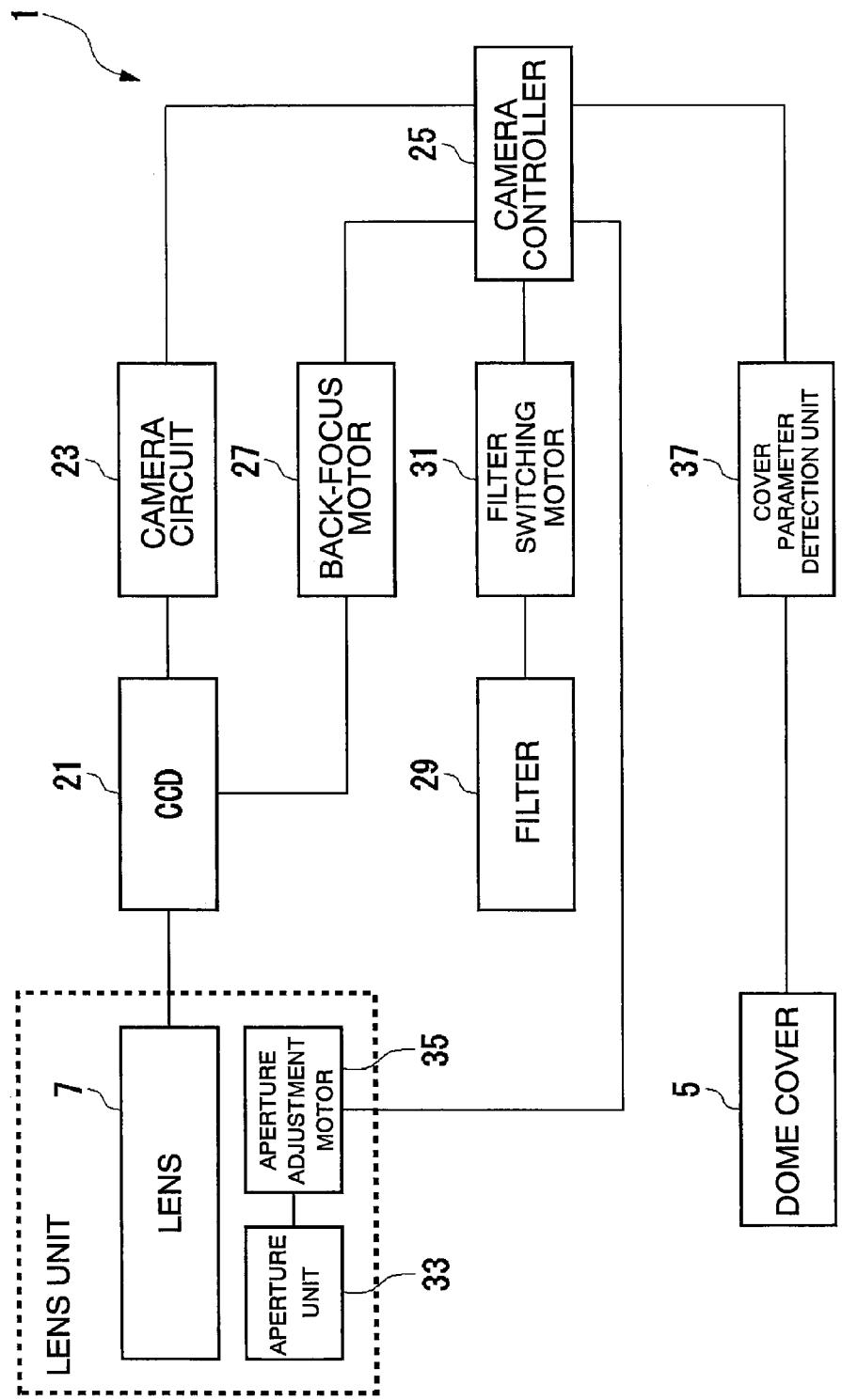
FIG. 1 is a block diagram of a domed monitoring camera apparatus according to an embodiment of the present invention.

DESCRIPTION OF SYMBOLS 1 domed monitoring camera apparatus
3 monitoring camera
5 dome cover
7 lens
21 CCD
23 camera circuit
25 camera controller
27 back-focus motor
29 filter
31 filter switching motor
33 aperture unit
35 aperture adjustment motor
37 cover parameter detection unit

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto.

A domed monitoring camera apparatus according to the present invention includes: a monitoring camera; a dome cover that covers the monitoring camera; an adjustment unit that, when the dome cover is attached, adjusts the focus of the monitoring camera with the cover attached to correct a variation in optical path length caused by the dome cover.

With such configuration, the focus of the monitoring camera is adjusted with the cover attached so as to correct a variation in optical path length caused by the dome cover, thus allowing reduction of a shift or discrepancy in focus dependent on a variation in optical path length caused by the dome cover.

The adjustment unit may adjust the focus of the monitoring camera with the cover attached according to an optical path length affecting cover parameter which represents a dome cover character (specification or feature) related to increase or decrease of the optical path length of the monitoring camera. With such configuration, the focus of the monitoring camera is adjusted with the cover attached according to the optical path length affecting cover parameter which represents the dome cover character related to increase or decrease of the optical path length of the monitoring camera, so it is possible to reduce a shift in focus dependent on a variation in optical path length due to the dome cover specifications.

The optical path length affecting cover parameter may include the dome cover material. With such configuration, it is possible to reduce a shift in focus dependent on a variation in optical path length caused by a difference in dome cover material.

The optical path length affecting cover parameter may include the dome cover thickness. With such configuration, it is possible to reduce a shift in focus caused by a variation in optical path length dependent on a difference in dome cover thickness.

The optical path length affecting cover parameter may include the dome cover transmissivity. With such configuration, it is possible to reduce a shift in focus caused by a variation in optical path length dependent on a difference in dome cover transmissivity.

The domed monitoring camera apparatus may include a detection unit that detects the optical path length affecting cover parameter; and the adjustment unit may change the position of the imaging element of the monitoring camera according to the optical path length affecting cover parameter detected by the detection unit, thereby performing back-focus adjustment. With such configuration, it is possible to suitably perform focus adjustment according to the optical path length affecting cover parameter.

The adjustment unit may also perform back-focus adjustment according to the aperture value of the monitoring camera. With such configuration, it is possible to cope with and compensate a variation in optical path length dependent on a variation in aperture value associated with illumination variation, allowing further reduction of a shift in focus.

The adjustment unit may also adjust the back-focus according to the color temperature of an image captured by the monitoring camera. With such configuration, it is possible to cope with and compensate a variation in optical path length dependent on a variation in color temperature, allowing further reduction of a shift in focus.

The dome cover may have a parameter representation shape part which corresponds to the optical path length affecting cover parameter; and the adjustment unit may change the position of the imaging element of the monitoring camera according to the shape of the parameter representation shape part, thereby performing back-focus adjustment. With such configuration, it is possible to preferably perform focus adjustment according to the optical path length affecting cover parameter.

The domed monitoring camera apparatus according to an embodiment of the present invention will be described with reference to the drawings.

Figure 2:
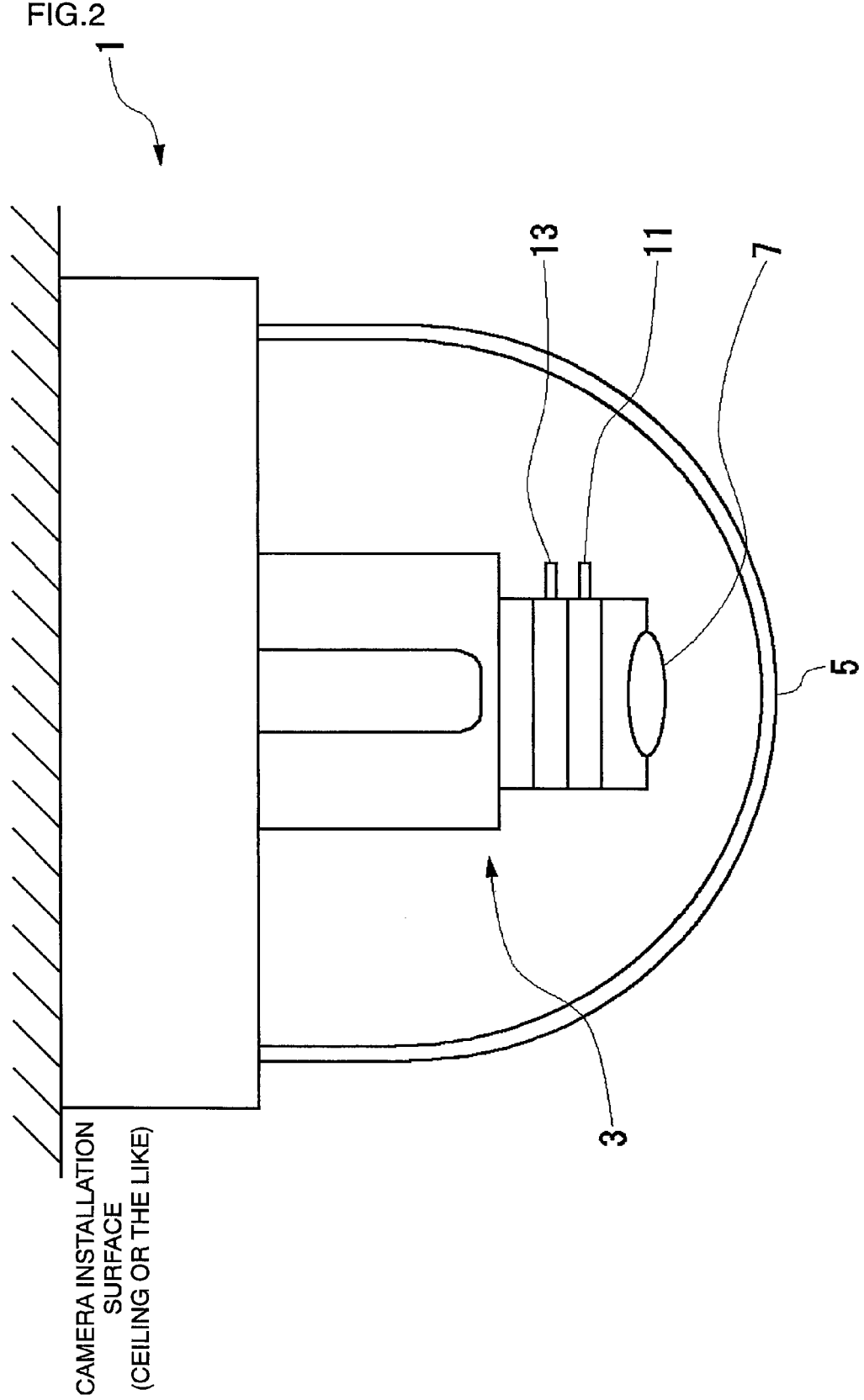
FIG. 2 is a schematic cross-sectional view of the domed monitoring camera apparatus.

FIGS. 1 and 2 illustrate the domed monitoring camera apparatus according to the embodiment of the present invention. First, referring to the schematic cross-sectional view of FIG. 2, the domed monitoring camera apparatus 1 includes a monitoring camera 3 being the camera body, and a dome cover 5 which covers the monitoring camera 3.

In the monitoring camera 3, a lens 7 is installed in a base 9 so that the lens 7 can be rotated manually in a pan direction and a tilt direction. The lens 7 is a varifocal lens (variable focus lens) and has a focus ring 11 and zoom ring 13. The focus ring 11 and zoom ring 13 are means for manually performing focus adjustment and zoom adjustment before the dome cover 5 is attached. The dome cover 5 is a transparent or semi-transparent cover of a hemispherical shape. A monitored image is captured through the dome cover 5 by the monitoring camera 3.

FIG. 1 is a functional block diagram of the domed monitoring camera apparatus 1. Referring to FIG. 1, most of the constituent components other than the dome cover 5 are included in the monitoring camera 3. As illustrated in FIG. 1, the domed monitoring camera apparatus 1 includes a CCD 21 that generates an image signal, a camera circuit 23 that processes the image signal, and a camera controller 25 being a microcomputer that controls the whole camera.

The CCD 21 is an exemplary imaging element and arranged on the optical axis of the lens 7. The CCD 21 converts an image formed by the lens 7 into an electrical image signal. The camera circuit 23 processes the image signal and outputs the resultant video signal to a monitor. The camera circuit 23 also calculates a light intensity and color temperature estimate value from the image signal, and outputs the data to the camera controller 25. Here, the calculation of color temperature may be performed by the camera controller 25.

The domed monitoring camera apparatus 1 further includes a back-focus motor 27, filter unit 29 and filter switching motor 31.

The back-focus motor 27, controlled by the camera controller 25, moves the CCD 21 along the optical axis to perform back-focus adjustment. The back-focus is a distance from the lens 7 (to be more in detail, the last one of a group of lenses constituting the lens 7) to the focal point.

The filter unit 29 is constituted of a filter for color photography and a filter for monochrome/IR photography. Switching between these filters is performed by the filter switching motor 31. The filter switching motor 31 is also controlled by the camera controller 25. The camera controller 25 controls the filter switching motor 31 to perform switching between the filters and also controls the back-focus motor 27 to perform back-focus adjustment.

The domed monitoring camera apparatus 1 further includes an aperture unit 33 and aperture adjustment motor 35. The aperture unit 33 and aperture adjustment motor 35 perform part of the lens function and are arranged along with the lens 7 as illustrated in FIG. 1. The aperture unit 33 and aperture adjustment motor 35 constitute the lens unit along with the lens 7. The aperture unit 33 is constituted of an iris arranged in the lens barrel of the lens 7. The aperture adjustment motor 35 is controlled by the camera controller 25 to drive the aperture unit 33, whereby the aperture is adjusted. The camera controller 25 determines an aperture value based on the light intensity received from the camera circuit 23, and controls the aperture adjustment motor 35.

The domed monitoring camera apparatus 1 according to the present embodiment is characterized by further including a cover parameter detection unit 37. The cover parameter detection unit 37 detects attachment of the dome cover 5 (the presence/absence of the dome cover 5), and further detects an optical path length affecting cover parameter (hereinafter referred to as a cover parameter). The cover parameter is a parameter which represents a dome cover character relative to increase or decrease of the optical path length of the monitoring camera 3. According to the present embodiment, the cover parameter is the material of the dome cover 5.

The camera controller 25 functions as the adjustment unit of the present invention; when the dome cover 5 is attached and the cover parameter is detected by the cover parameter detection unit 37, the camera controller 25 adjusts the focus according to the detected cover parameter. Thus, the camera controller 25 corrects the optical path difference according to the cover parameter. According to the present embodiment, the camera controller 25 controls the back-focus motor 27 according to the cover parameter to perform back-focus adjustment, whereby focus adjustment is performed.

The camera controller 25 also controls the back-focus motor 27 according to the aperture value to perform back-focus adjustment. As described above, the camera controller 25 determines an aperture value based on a light intensity received from the camera circuit 23 and controls the aperture adjustment motor 35. In this case, the camera controller 25 not only controls the aperture adjustment motor 35 but also controls the back-focus motor 27 according to the aperture value.

The camera controller 25 also controls the back-focus motor 27 according to the color temperature of a captured image. The color temperature is, as described above, supplied from the camera circuit 23.

As described above, the camera controller 25 can perform focus adjustment of the monitoring camera 3 by performing back-focus adjustment. The back-focus adjustment mechanism is originally provided as a mechanism for the adjustment associated with filter switching. The present embodiment takes advantage of this back-focus adjustment mechanism; focus adjustment is performed according to the cover parameter at the time of attaching the cover, and also according to the aperture value and color temperature.

Figure 3:
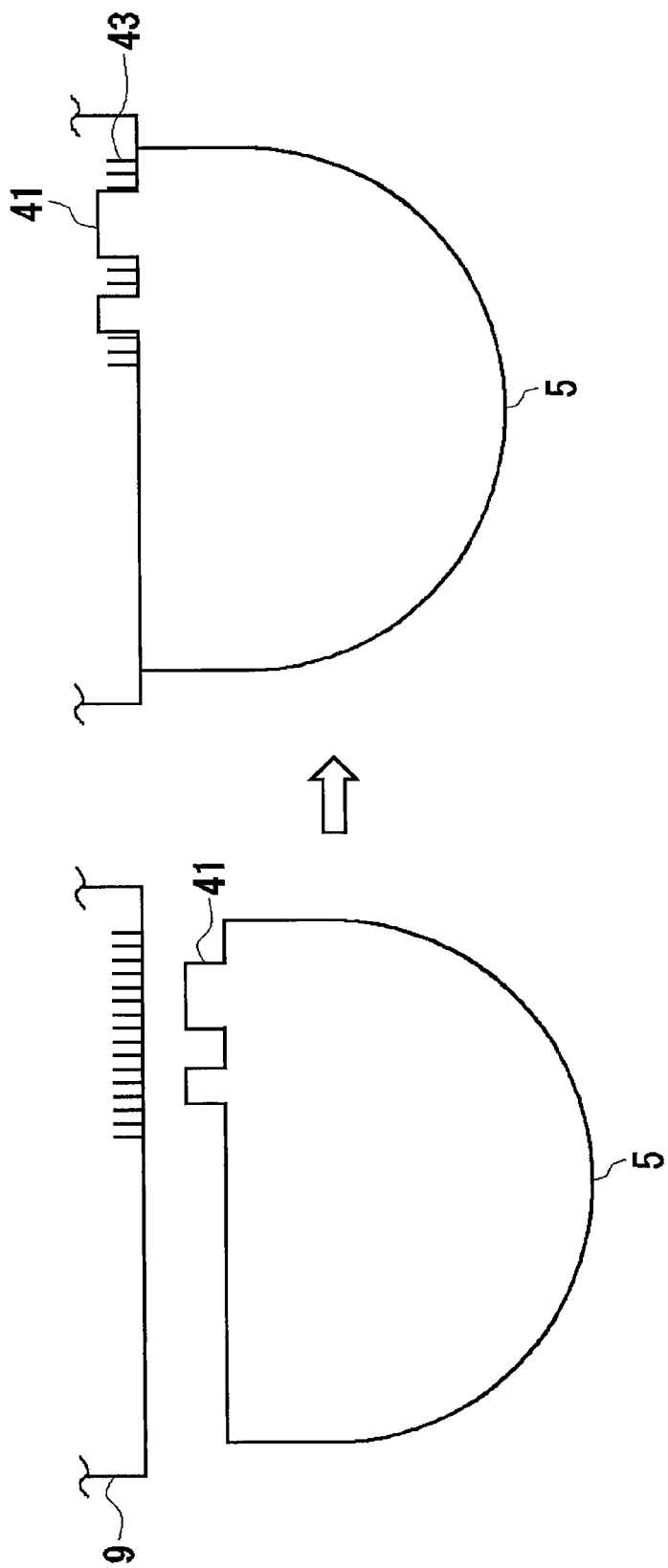
FIG. 3 is a view illustrating an example of cover parameter detection unit.

FIG. 3 illustrates an exemplary configuration of the cover parameter detection unit 37. In FIG. 3, the dome cover 5 has a protrusion 41 having a different shape according to the cover parameter. The protrusion 41 is coated with conductive film. In the monitoring camera 3, there are arranged multiple terminals 43 at an appropriate interval. The multiple terminals 43 are arranged, for example, in the base 9 of the monitoring camera 3 and connected to the camera controller 25. When the dome cover 5 is attached to the monitoring camera 3, the protrusion 41 comes into contact with the terminals 43, and a signal indicating the contact is inputted to the camera controller 25, whereby it is detected that the dome cover 5 has been attached. Then, the camera controller 25 identifies the cover parameter based on the signal from the terminals 43; the cover parameter is identified by the position and number of the terminals 43 which are in contact with the protrusion 41.

FIG. 4 illustrates an example of variation in optical path length dependent on the cover parameter. In FIG. 4, the cover parameter is the cover material. As the cover material, there are four materials: acrylic, quart (glass), cycloolefin polymer (for example, Zeonex (registered trademark)), and polycarbonate. The other conditions are as follows: the size of the CCD 21 is ⅓ inches, the lens 7 is a varifocal lens (variable focus lens), and the dome radius is 45 mm.

Referring to FIG. 4, the variation in optical path length is a difference between the optical path length without the cover and the optical path length when the cover of each material is attached. More specifically, the variations in optical path length for acrylic, quart, cycloolefin polymer and polycarbonate are 38.3 μm, 39.7 μm, 40.2 μm and 43.9 μm respectively.

The camera controller 25 stores the variations of FIG. 4 as the back-focus correction quantity, and performs back-focus correction according to the correction quantity which corresponds to the detected cover material.

FIG. 5 illustrates an example of variation in optical path length dependent on the aperture value. The other conditions are approximately similar to those of the example of FIG. 4. FIG. 5 illustrates the optical path length when the aperture value is F2.8, F5.6 or F11.2. In FIG. 5, the variation in optical path length is an optical path length at each aperture value with reference to the optical path length at the aperture value of F2.8. That is, the variation in optical path length is a difference between the optical path length at each aperture value and the optical path length at the reference aperture value of F2.8. More specifically, the variations at the aperture values of F2.8, F5.6 and F11.2 are 0 μm, 12.9 μm and 18.4 μm respectively. As illustrated in FIG. 5, as the aperture value increases, the optical path length becomes greater and thus the variation becomes also greater.

The camera controller 25 stores the variations of FIG. 5 as the back-focus correction quantity, and performs back-focus correction according to the correction quantity which corresponds to the aperture value. More specifically, when the aperture value is F2.8, the correction quantity is 0; and the camera controller 25 performs no back-focus correction. When the aperture value is F5.6 or F11.2, the camera controller 25 performs back-focus correction according to the correction quantity which corresponds to the aperture value.

FIG. 6 illustrates an example of variation in optical path length dependent on the color temperature. The other conditions are approximately similar to those of the example of FIG. 4. FIG. 6 illustrates the optical path length when the color temperature is 400~600 nm, 600~800 nm or 800~1000 nm. In FIG. 6, the variation in optical path length is an optical path length at each color temperature with reference to the optical path length at the color temperature of 400~600 nm. That is, the variation in optical path length is a difference between the optical path length at each color temperature and the optical path length at the reference color temperature of 400~600 nm. More specifically, the variations at the color temperatures of 400~600 nm, 600~800 nm and 800~1000 nm are 0 μm, 50.9 μm and 95.2 μm, respectively. As illustrated in FIG. 6, as the color temperature increases, the optical path length becomes greater and thus the variation becomes also greater.

The camera controller 25 stores the variations of FIG. 6 as the back-focus correction quantity, and performs back-focus correction according to the correction quantity which corresponds to the color temperature. More specifically, when the color temperature is 400~600 nm, the correction quantity is 0; and the camera controller 25 performs no back-focus correction. When the color temperature is 600~800 nm or 800~1000 nm, the camera controller 25 performs back-focus correction according to the correction quantity which corresponds to the color temperature.

The configuration of the domed monitoring camera apparatus 1 according to the present embodiment has been described. The operation of the domed monitoring camera apparatus 1 will now be described. In installing the domed monitoring camera apparatus 1, first the base unit 9 of the monitoring camera 3 is secured to the installation location such as ceiling with the dome cover 5 removed. Then, the lens 7 is manually rotated in a pan direction and a tilt direction, so that the lens 7 is oriented in a monitoring and photography direction. Further, the focus ring 11 and the zoom ring 13 are manually rotated to perform focus adjustment and zoom adjustment. After completion of these adjustments, the adjustment mechanisms are fixed, and the dome cover 5 is attached to the monitoring camera 3.

When the dome cover 5 is attached, the attachment of the cover and the cover parameter are detected by the cover parameter detection unit 37. The camera controller 25 controls the back-focus motor 27 according to the cover parameter to perform back-focus adjustment. According to the present embodiment, the cover parameter is, as described above, the cover material. The camera controller 25 controls the back-focus motor 27 to move the CCD 21 in a direction of optical axis, as described with reference to FIG. 4, according to the correction quantity which corresponds to the cover material, whereby back-focus adjustment is performed. In this way, focus adjustment is performed according to the cover parameter with the dome cover 5 attached.

After attachment of the dome cover 5 and completion of the camera installation operation, the monitoring and photography operation of the monitoring camera 3 starts. The CCD 21 converts an image formed by the lens 7 into an electrical image signal and outputs the signal to the camera circuit 23. The camera circuit 23 processes the image signal and outputs a video signal to the monitor. The camera circuit 23 calculates a light intensity and color temperature from the image signal and outputs the calculated data to the camera controller 25.

The camera controller 25 determines an aperture value based on the light intensity received from the camera circuit 23 and controls the aperture adjustment motor 35. At this time, the camera controller 25 not only controls the aperture adjustment motor 35 but also controls the back-focus motor 27 according to the aperture value. The camera controller 25 controls the back-focus motor 27 to move the CCD 21 in a direction of optical axis, as described with reference to FIG. 5, according to the correction quantity which corresponds to the aperture value, whereby back-focus adjustment is performed.

The camera controller 25 also controls the back-focus motor 27 according to the color temperature received from the camera circuit 23. The camera controller 25 controls the back-focus motor 27 to move the CCD 21 in a direction of optical axis, as described with reference to FIG. 6, according to the correction quantity which corresponds to the color temperature, whereby back-focus adjustment is done.

The operation of the domed monitoring camera apparatus 1 has been described. The advantages of the present embodiment will now be described with reference to FIG. 7.

Figure 7:
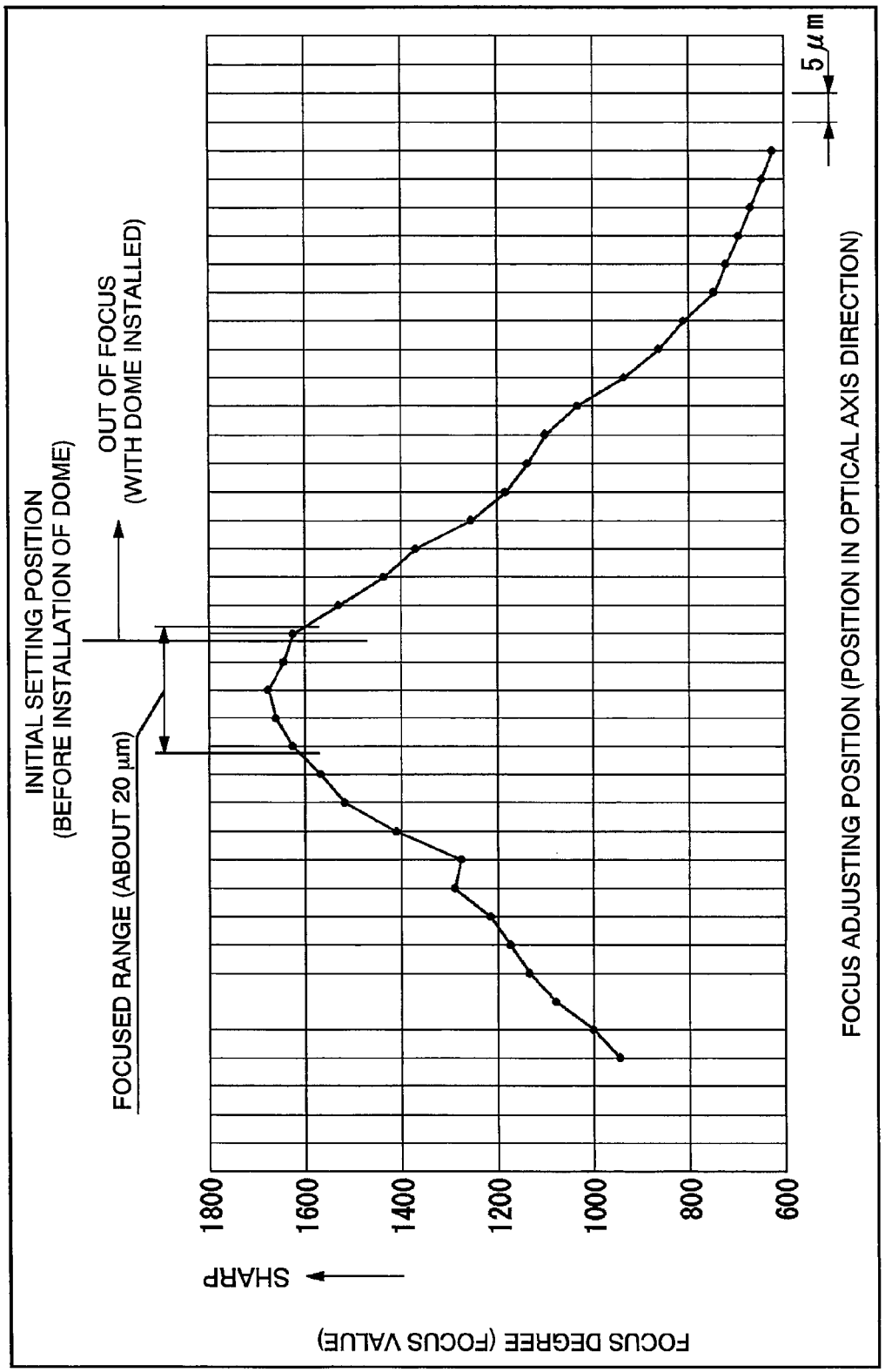
FIG. 7 illustrates a relationship between the focus adjusting position and the focus degree.

FIG. 7 illustrates an example of the focus degree (focus value) dependent on the focus adjusting position. The abscissa indicates the focus adjusting position; the ordinate indicates the focus degree. The image becomes sharp with the increase of the focus degree. Here, a range of about 20 μm (±10 μm) containing a focus adjusting position at which the focus degree is greatest is regarded as the focused range.

According to the present embodiment, the lens 7 is a varifocal lens (variable focus lens); and focus adjustment is manually performed by using the focus ring 11 before attachment of the dome cover 5. Accordingly, as illustrated in the example of FIG. 7, the initial setting position before attachment of the cover falls into the focused range. However, when the dome cover 5 is attached, the optical path length varies according to the cover parameter; as a result, the focus adjusting position may leave the focused range, causing blurring. In the domed monitoring camera apparatus 1 according to the present embodiment, the above described phenomenon is taken into consideration; and when the dome cover 5 is attached, back-focus adjustment is performed to compensate a variation in optical path length. Accordingly, it is possible to prevent blurring.

Exemplary applications and variations of the above embodiment will be described.

According to the above embodiment, the cover parameter is the cover material. However, as the cover parameter, parameters other than the cover material may be used. Examples of the other cover parameters include the cover thickness and the cover transmissivity described below.

FIG. 8 illustrates an example of variation in optical path length dependent on the cover parameter when the cover parameter is the cover thickness. The other conditions are approximately similar to those of the example of FIG. 4. In the example of FIG. 8, the cover material is cycloolefin polymer. In FIG. 8, the variation in optical path length is a difference between the optical path length at the cover thickness of 0 mm (with no cover) and the optical path length at each cover thickness. As illustrated in FIG. 8, as the thickness of the dome cover 5 increases, the optical path length becomes greater and thus the variation becomes also greater.

When the cover parameter is the cover thickness, the dome cover 5 has a different protrusion 41 according to the cover thickness. Using the protrusion 41, the cover parameter detection unit 37 detects the cover thickness (refer to FIG. 2). The camera controller 25 stores the variations of FIG. 8 as the back-focus correction quantity; and when attachment of the cover and the cover thickness are detected, the camera controller 25 performs back-focus correction according to the correction quantity which corresponds to the detected cover thickness.

FIG. 9 illustrates an example of variation in optical path length dependent on the cover parameter when the cover parameter is the cover transmissivity. The other conditions are approximately similar to those of the example of FIG. 4. The cover transmissivity of 1 is the value for a transparent cover. The cover transmissivity of ¼ or 1/16 is the value for a semi-transparent cover such as a smoked cover. In FIG. 9, the variation in optical path length is an optical path length at each cover transmissivity with reference to the optical path length at the cover transmissivity of 1. That is, the variation in optical path length is a difference between the optical path length at each cover transmissivity and the optical path length at the reference cover transmissivity of 1. More specifically, the variations in optical path length at the cover transmissivities of 1, ¼ and 1/16 are 0 μm, 12.9 μm and 18.4 μm, respectively. As illustrated in FIG. 9, as the optical cover transmissivity decreases, the optical path length becomes greater and thus the variation becomes also greater.

When the cover parameter is the cover transmissivity, the dome cover 5 has a different protrusion 41 according to the cover transmissivity. Using the protrusion 41, the cover parameter detection unit 37 detects the cover transmissivity (refer to FIG. 2). The camera controller 25 stores the variations of FIG. 9 as the back-focus correction quantity; and when attachment of the cover and the cover transmissivity are detected, the camera controller 25 performs back-focus correction according to the correction quantity which corresponds to the detected cover transmissivity.

As the cover parameter, multiple parameters may be detected. For example, two or more of the above described three cover parameters may be detected, so that back-focus adjustment is performed according to the multiple parameters. As a result, the accuracy of focus adjustment can be further improved.

Variations of the back-focus adjustment mechanism will be described. According to the above embodiment, the back-focus motor 27 is driven under the control of the camera controller 25 being a microcomputer, whereby back-focus adjustment is electrically performed. As a variation described below, the dome cover has a parameter representation shape part according to the cover parameter. Further, the monitoring camera 3 includes a mechanical mechanism which changes the position of the imaging element in a direction of optical axis according to the parameter representation shape part. Accordingly, back-focus adjustment is mechanically performed. The parameter representation shape part may be a cover protrusion similar to the one used in the above embodiment.

Figure 10:
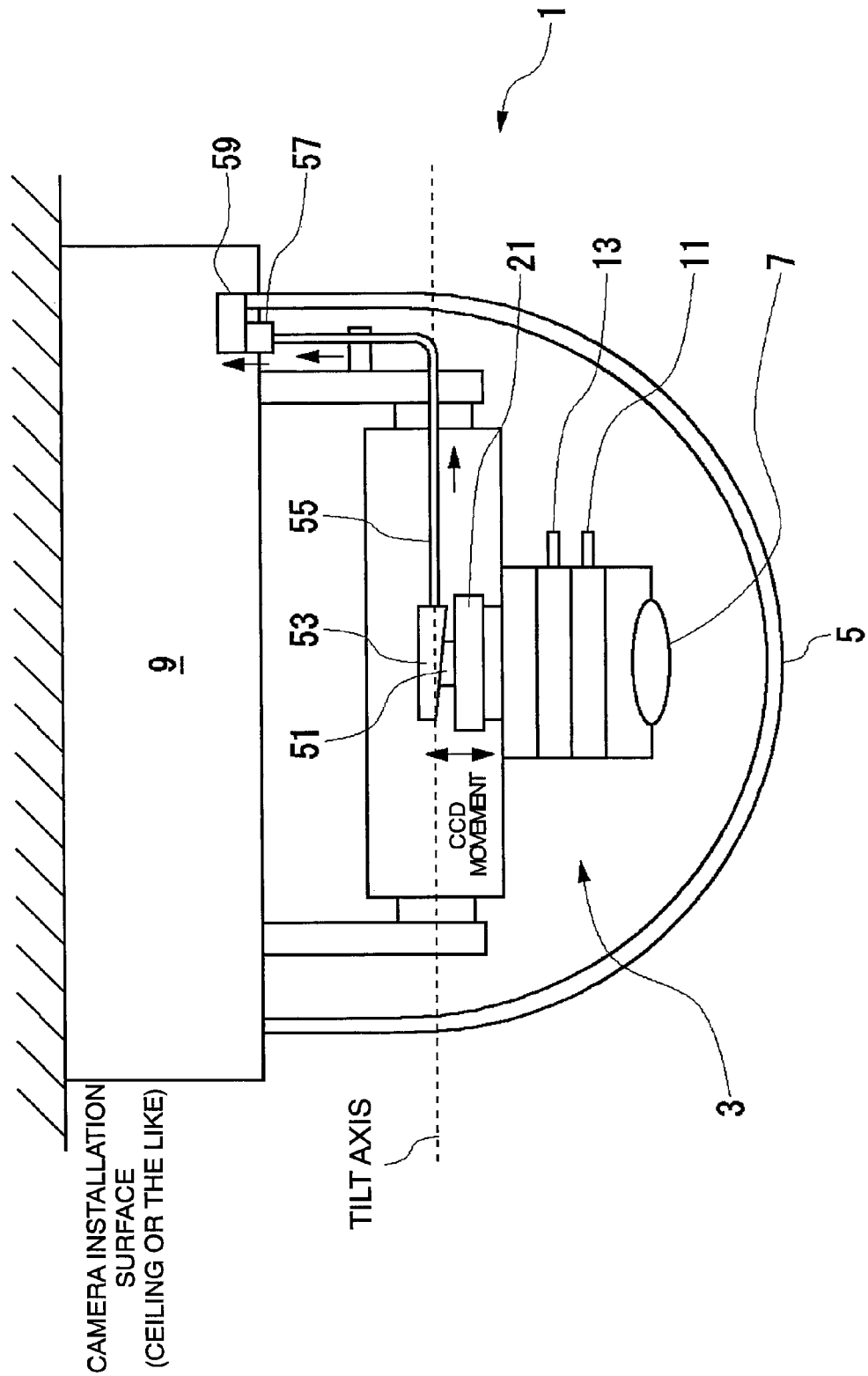
FIG. 10 is a view illustrating a mechanical adjustment mechanism for performing back-focus adjustment according to the cover parameter.
Figure 11:
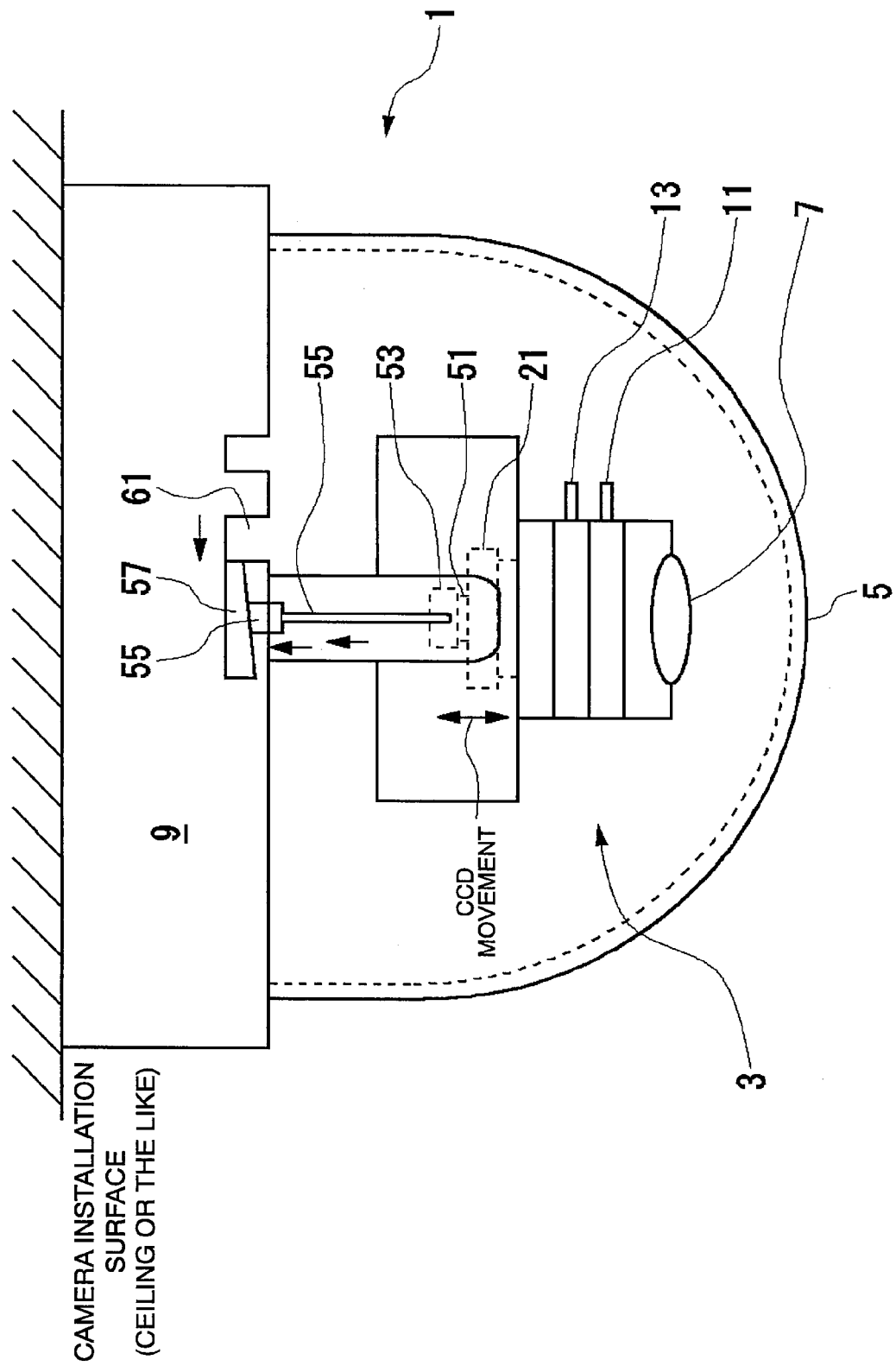
FIG. 11 is a view illustrating a mechanical adjustment mechanism for performing back-focus adjustment according to the cover parameter.

FIGS. 10 and 11 illustrate the mechanical adjustment mechanism. In FIGS. 10 and 11, the lower part is referred to as "the front", and the upper part as "the backside". Backward direction is a direction from the dome top through the dome center to the camera installation surface. Further, in FIGS. 10 and 11, a horizontal direction, i.e., a direction orthogonal to the front-backside direction is referred to as a "lateral direction".

As illustrated in figures, a first driven piece 51 is secured to the back surface side of the CCD 21. The first driven piece 51 is in contact with an inclined surface of a first cam 53. The first driven piece 51 is urged or biased in a backside direction against the first cam 53. Though not illustrated in figures, the urging or biasing member is, for example, an elastic member such as a spring. The first cam 53 is disposed slidably in a lateral direction.

The first cam 53 is disposed on a tilt axis of the monitoring camera 3. Connected to the first cam 53 is one end of a wire 55. The wire 55 extends along a tilt axis from the first cam 53 and then curves and further extends towards the backside along a supporting member which supports the monitoring camera 3 rotatably in a tilt direction.

The tip end of the wire 55 is attached to a second driven piece 57. The second driven piece 57 is urged or biased towards the backside. The second driven piece 57 is in contact with an inclined surface of a second cam 59. Though not illustrated in figures, the urging or biasing member of the second driven piece 57 is, for example, an elastic member such as a spring. The second cam 59 is disposed slidably in a lateral direction.

The dome cover 5 has, as illustrated in figures, a protrusion 61 on its end face. The protrusion 61 corresponds to the parameter representation shape part. The position of the protrusion 61 changes according to the cover parameter.

In attaching the dome cover 5 to the monitoring camera 3, the dome cover 5 is manually rotated around the dome central axis, and arranged in a predetermined installation position (angle position) of the monitoring camera 3, and fixed. In the rotating operation of the installation process, the protrusion 61 pushes the second cam 59, so the second cam 59 slides in a lateral direction and the contact position between the inclined surface of the second cam 59 and the second driven piece 57 changes, and the second driven piece 57 moves towards the backside. As a result, the wire 55 is stretched, so the first cam 53 slides in a direction of tilt axis. Then, the contact position between the inclined surface of the first cam 53 and the first driven piece 51 changes, and the first driven piece 59 moves towards the backside, and the CCD 21 also moves towards the backside along with the first driven piece 59.

Here, as described above, the position of the protrusion 61 changes according to the cover parameter. Thus, the sliding distance of the second cam 59 varies according to the cover parameter, so the movement distance of the second driven piece 57 varies, the sliding distance of the first cam 53 varies, the movement distance of the first driven piece 51 varies, and the movement distance of the CCD 21 along the optical axis also varies. In this way, the back-focus adjustment according to the cover parameter can be performed with the cover attached, without manipulating the cover from the outside.

The domed monitoring camera apparatus 1 according to the embodiment of the present invention has been described. As described above, according to the present embodiment, the focus of the monitoring camera 3 is adjusted with the cover attached so as to correct a variation in optical path length caused by attachment of the dome cover 5. Consequently, a shift (discrepancy) in focus dependent on a variation in optical path length caused by the dome cover 5 can be reduced.

According to the present embodiment, the focus of the monitoring camera 3 is adjusted with the cover attached according to the optical path length affecting cover parameter which represents dome cover the character related to increase or decrease of the optical path length of the monitoring camera 3. Consequently, a shift in focus caused by a variation in optical path length dependent on the dome cover specifications can be reduced.

According to the present embodiment, as has been described above with reference to FIG. 4, for example, the material of the dome cover 5 is used as the optical path length affecting cover parameter. Consequently, a shift in focus caused by a variation in optical path length dependent on the material of the dome cover 5 can be reduced.

According to the present embodiment, as has been described above with reference to FIG. 8, the thickness of the dome cover 5 may be used as the optical path length affecting cover parameter. Thus, a shift in focus caused by a variation in optical path length dependent on the thickness of the dome cover 5 can be reduced. For example, when a greater thickness cover is used from a viewpoint of vandalproof, also, the focus can be suitably adjusted.

According to the present embodiment, as has been described above with reference to FIG. 9, the transmissivity of the dome cover 5 may be used as the optical path length affecting cover parameter. Thus, a shift in focus caused by a variation in optical path length dependent on the transmissivity of the dome cover 5 can be reduced; when a smoked cover is used so that the monitoring camera inside the cover can be hardly seen from the outside, also, the focus can be preferably adjusted.

The domed monitoring camera apparatus 1 according to the present embodiment includes the detection unit that detects the optical path length affecting cover parameter; and the adjustment unit changes the position of the imaging element of the monitoring camera according to the optical path length affecting cover parameter detected by the detection unit, whereby back-focus adjustment is performed. Accordingly, focus adjustment can be suitably performed according to the optical path length affecting cover parameter. The detection unit and the adjustment unit correspond to the cover parameter detection unit 37 and the camera controller 25 illustrated in FIG. 1 in the above described example.

According to the present embodiment, back-focus adjustment is also performed according to the aperture value of the monitoring camera 3. Accordingly, it is possible to cope with and compensate a variation in optical path length caused by a variation in aperture value associated with illumination variation, allowing further reduction of a shift in focus.

According to the present embodiment, back-focus adjustment is also performed according to the color temperature of an image captured by the monitoring camera 3. Accordingly, it is possible to cope with and compensate a variation in optical path length caused by a variation in color temperature, allowing further reduction of a shift in focus.

According to the present embodiment, as has been described above with reference to FIGS. 10 and 11, the dome cover 5 may have a parameter representation shape part which corresponds to the optical path length affecting cover parameter; and the adjustment unit may be means for changing the position of the imaging element of the monitoring camera 3 according to the shape of the parameter representation shape part, thereby performing back-focus adjustment. With such mechanical configuration, focus adjustment can be suitably performed according to the optical path length affecting cover parameter.

According to the embodiment, back-focus adjustment is performed by moving the imaging sensor, whereby focus adjustment is performed. However, in the scope of the present invention, focus adjustment may be performed by moving the lens.

While there has been described what is at present considered to be a preferred embodiment of the invention, it will be understood that various modifications and variations may be made thereto, and it is intended that appended claims cover all such modifications and variations as fall within the true spirit and scope of the invention.

INDUSTRIAL APPLICABILITY

As described above, in the domed monitoring camera apparatus according to the present invention, the focus of the monitoring camera is adjusted with the cover attached so as to correct a variation in optical path length caused by the dome cover. Accordingly, the present invention has an advantage in that a shift in focus dependent on a variation in optical path length caused by the dome cover can be reduced, so the present invention is useful for a monitoring camera and the like.

The invention claimed is:

1. A domed monitoring camera apparatus comprising:
a monitoring camera;
a dome cover for covering the monitoring camera; and
an adjustment unit that, when the dome cover is attached, adjusts the focus of the monitoring camera with the cover attached according to an optical path length affecting cover parameter to correct a variation in optical path length caused by the dome cover, and
wherein the dome cover comprises the optical path length affecting cover parameter that represents a dome cover character related to an increase or decrease of the optical path length of the monitoring camera and includes a feature of the dome cover.

2. The domed monitoring camera apparatus according to claim 1, wherein the optical path length affecting cover parameter includes the material of the dome cover.

3. The domed monitoring camera apparatus according to claim 1, wherein the optical path length affecting cover parameter includes the thickness of the dome cover.

4. The domed monitoring camera apparatus according to claim 1, wherein the optical path length affecting cover parameter includes the transmissivity of the dome cover.

5. The domed monitoring camera apparatus according to claim 1, further comprising a detection unit for detecting the optical path length affecting cover parameter, wherein the adjustment unit performs back-focus adjustment by changing the position of an imaging element of the monitoring camera according to the optical path length affecting cover parameter detected by the detection unit.

6. The domed monitoring camera apparatus according to claim 5, wherein the adjustment unit also performs the back-focus adjustment according to an aperture value of the monitoring camera.

7. The domed monitoring camera apparatus according to claim 5, wherein the adjustment unit also performs the back-focus adjustment according to a color temperature of an image captured by the monitoring camera.

8. The domed monitoring camera apparatus according to claim 1, wherein:
the dome cover has a parameter representation shape part which corresponds to the optical path length affecting cover parameter; and
the adjustment unit performs back-focus adjustment by changing the position of the imaging element of the monitoring camera according to the shape of the parameter representation shape part.

9. A focus adjustment method for a domed monitoring camera apparatus having a monitoring camera covered with a dome cover, the method comprising: when the dome cover is attached, adjusting the focus of the monitoring camera with the cover attached according to an optical path length affecting cover parameter so as to correct a variation in optical path length caused by the dome cover, and
wherein the dome cover comprises the optical path length affecting cover parameter that represents a dome cover character related to an increase or decrease of the optical path length of the monitoring camera and includes a feature of the dome cover.

10. The focus adjustment method for a domed monitoring camera apparatus according to claim 9, the method comprising: detecting the optical path length affecting cover parameter, and performing back-focus adjustment by changing the position of an imaging element of the monitoring camera according to the detected optical path length affecting cover parameter.

11. A domed monitoring camera apparatus comprising:
a monitoring camera;
a dome cover for covering the monitoring camera;
a cover parameter detection unit for detecting an optical path length affecting cover parameter; and
an adjustment unit that, when the dome cover is attached, adjusts the focus of the monitoring camera with the cover attached according to the optical path length affecting cover parameter to correct a variation in optical path length caused by the dome cover, and
wherein the dome cover comprises the optical path length affecting cover parameter that represents a dome cover character related to an increase or decrease of the optical path length of the monitoring camera and includes a feature of the dome cover.

12. The domed monitoring camera apparatus according to claim 11, wherein the optical path length affecting cover parameter includes the material of the dome cover.

13. The domed monitoring camera apparatus according to claim 11, wherein the optical path length affecting cover parameter includes the thickness of the dome cover.

14. The domed monitoring camera apparatus according to claim 11, wherein the optical path length affecting cover parameter includes the transmissivity of the dome cover.

15. The domed monitoring camera apparatus according to claim 11, wherein the adjustment unit performs back-focus adjustment by changing the position of an imaging element of the monitoring camera according to the optical path length affecting cover parameter detected by the detection unit.

16. The domed monitoring camera apparatus according to claim 15, wherein the adjustment unit also performs the back-focus adjustment according to an aperture value of the monitoring camera.

17. The domed monitoring camera apparatus according to claim 15, wherein the adjustment unit also performs the back-focus adjustment according to a color temperature of an image captured by the monitoring camera.

18. The domed monitoring camera apparatus according to claim 11, wherein:
   the dome cover has a parameter representation shape part which corresponds to the optical path length affecting cover parameter; and
   the adjustment unit performs back-focus adjustment by changing the position of the imaging element of the monitoring camera according to the shape of the parameter representation shape part.

* * * * *